(12) United States Patent
Weber et al.

(10) Patent No.: US 6,423,767 B1
(45) Date of Patent: Jul. 23, 2002

(54) POLYCARBONATE MOULDING MATERIALS

(75) Inventors: Martin Weber, Maikammer; Thomas Fritzsche, Ludwigshafen; Manfred Knoll, Wachenheim; Xaver Hopfenspirger, Hassloch, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/555,597

(22) PCT Filed: Nov. 20, 1998

(86) PCT No.: PCT/EP98/07462

§ 371 (c)(1),
(2), (4) Date: May 31, 2000

(87) PCT Pub. No.: WO99/28386

PCT Pub. Date: Jun. 10, 1999

(30) Foreign Application Priority Data

Dec. 3, 1997 (DE) .......................... 197 53 541

(51) Int. Cl.⁷ .................... C08K 5/092; C08K 5/42; C08L 69/00
(52) U.S. Cl. .................. 524/158; 524/296; 524/298; 524/320; 524/321; 524/322; 525/67; 525/133; 525/146; 525/148
(58) Field of Search ........................ 524/158, 298, 524/296, 321, 322, 320; 525/67, 133, 146, 148

(56) References Cited

U.S. PATENT DOCUMENTS

| | | | |
|---|---|---|---|
| 3,951,903 A | * | 4/1976 | Shaffer |
| 4,299,929 A | * | 11/1981 | Sakano |
| 4,791,158 A | | 12/1988 | Lausberg et al. |
| 5,106,907 A | * | 4/1992 | Boutni |
| 5,272,193 A | | 12/1993 | Fuhr et al. |
| 5,420,181 A | * | 5/1995 | Eichenauer |

FOREIGN PATENT DOCUMENTS

| | | | |
|---|---|---|---|
| CA | 2099480 | | 1/1994 |
| DE | 40 34 336 | | 4/1992 |
| DE | 196 06198 | | 8/1997 |
| EP | 256 461 | | 2/1988 |
| EP | 391 413 | | 10/1990 |
| EP | 452 788 | | 10/1991 |
| EP | 520 074 | | 12/1992 |
| EP | 522 397 | | 1/1993 |
| EP | 549 205 | | 6/1993 |
| EP | 576 948 | | 1/1994 |
| EP | 709 432 | | 5/1996 |
| JP | 03-021664 | * | 1/1991 |
| JP | 08-193151 | * | 7/1996 |
| WO | 96/06136 | | 2/1996 |

OTHER PUBLICATIONS

Encyclopedia of Polymer Science vol. 7, p. 565, 1989.*
JP Abst 03/021664.
JP Patent Kokai H9–137054.

* cited by examiner

Primary Examiner—David J. Buttner
(74) Attorney, Agent, or Firm—Keil & Weinkauf

(57) ABSTRACT

A) at least one polycarbonate,
B) at least one graft polymer based on an elastomer having a glass transition point below 10° C.,
C) at least one copolymer containing vinylaromatic monomers,
D) at least one filler,
E) at least one low molecular weight halogen-free acid and, if desired, additionally
F) at least one polyalkyl acrylate and
G) at least one flame retardant and
H) at least one additive,
and which are characterized by the fact that they contain
I) at least one aromatic or partially aromatic polyester or a mixture thereof.

Shaped articles, films or fibers, particularly external autobody parts, made of said molding compositions.

12 Claims, No Drawings

POLYCARBONATE MOULDING MATERIALS

The present invention relates to molding compositions which contain

A) at least one polycarbonate,
B) at least one graft polymer based on an elastomer having a glass transition point below 10° C.,
C) at least one copolymer containing vinylaromatic monomers,
D) at least one filler,
E) at least one low molecular weight halogen-free acid and, if desired, additionally F) at least one polyalkyl acrylate and
G) at least one flame retardant and
H) at least one additive, and which are chracterized by the fact that they contain, as further components, I) at least one aromatic or partially aromatic polyester or a mixture thereof.

In addition, the present invention relates to the use of the molding compositions for the preparation of shaped articles, films or fibers and to the shaped articles that are prepared therefrom.

Filled polycarbonate molding compositions containing graft polymers based on dienes (ABS) or acrylates (ASA) and styrene copolymers are known. It is also known that they can be equipped with diverse flame retardants. Such molding compositions are mainly used for the manufacture of shaped articles for, say, the motorcar industry.

DE-A1 4,034,336 discloses polycarbonate molding compositions in which the antidrip agents used are polyfluorinated alkanesulfonic acid derivatives or polyfluorinated carboxylic acid derivatives instead of polytetrafluoroethylene. The molding compositions described therein show improved penetration impact resistance at low temperatures and short overall burning times, but do not satisfy the present-day requirements regarding freedom from halogens, on the one hand, and show relatively low heat deformation resistance, on the other hand.

Filled molding compositions based on polycarbonate and comprising styrene copolymers containing oxazoline groups and, as supplementary components, polyesters, particularly partially aromatic polyesters, are disclosed by DE-A1 1,960,198. They are distinguished by good strength properties, and good elongation at break and impact resistance. However, the low-temperature damage factor of such molding compositions is unsatisfactory.

WO 96/06136 and EP-B 1,391,413 describe polycarbonate molding compositions which are filled with talcum having an aspect ratio of from 4 to 40 and from 4 to 24 respectively and a particle size of less than 44 and less than 10 μm respectively, for which reason the parts that are prepared therefrom show a low tendency to distortion and have good impact resistances. According to the first-named specification the copolymer that is present in the molding compositions should have as high a molecular weight as possible. According to the last-named specification, the polycarbonate molding compositions can contain added amorphous polymers, including amorphous polyesters. Drawbacks of the said molding compositions are that they do not flow well and are difficult to process. Furthermore, they suffer from the drawback that the notched impact strength is insufficient for many purposes.

EP-A 1,522,397 discloses polycarbonate molding compositions which may contain polyalkylene terephthalates and which, when flame-treated, do not become deformed or form drops of flaming substance. They can be obtained by mixing their components with aramides and sulfonates. This has the disadvantage that the tenacity of corresponding molding compositions is considerably reduced.

EP-A 1,576,948 proposes that basic impurities which can cause degradation of the polycarbonate and which can be entrained into the molding compositions via recycled ABS, be neutralized by adding polymer resins containing acid groups. As examples thereof poly(meth)acrylic acid or partially saponified poly(meth)acrylates are mentioned. Their molecular weights (weight average $M_w$) are preferably up to 500,000 g/mol. The molding compositions described in EP-A 1,576,948 may contain aromatic polyesters as one of their supplementary components. These molding compositions are not impact-resistant or tenacious enough for many applications.

Molding compositions revealed in JP-A 9/137054 can contain saturated polyesters. In order to keep down the decomposition of the polycarbonate, these molding compositions are filled with neutral talcum, which, however, requires an additional technical process step and is therefore elaborate and cost-intensive.

It is an object of the present invention to provide polycarbonate molding compositions which do not suffer from the above drawbacks. In particular, the polycarbonate molding compositions should be easy to process to large shaped articles suitable for use as external autobody parts. Since they are thus required to replace metal, polycarbonate molding compositions must be found which satisfy a wide range of stringent demands.

This object is achieved by the molding compositions defined above. Special embodiments are given in the subclaims and description.

Component A

The component A present in the molding compositions of the invention comprises a polycarbonate or a mixture of two or more different polycarbonates. Preferred molding compositions of the invention contain from 1 to 97.35 wt %, based on the total weight of the molding compositions, of component A. We particularly prefer molding compositions of the invention which contain from 10 to 91.9 wt %, based on the total weight of the molding compositions, of component A.

We prefer to use halogen-free polycarbonates as component A. Suitable halogen-free polycarbonates are for example those based on diphenols of the general formula I

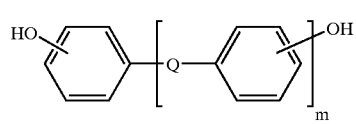

in which Q is a single bond or denotes a $C_1$–$C_3$ alkylene group, a $C_2$–$C_3$ alkylidene group, a $C_3$–$C_6$ cycloalkylidene group, a $C_6$–$C_{12}$ arylene group, or —O—, —S— or —SO$_2$— and m is an integer from 0 to 2.

The diphenols I may optionally carry substituents on the phenylene radicals, for example $C_1$–$C_6$ alkyl or $C_1$–$C_6$ alkoxy.

Preferred diphenols of formula I are for example hydroquinone, resorcinol, 4,4'-dihydroxydiphenyl, 2,2-bis(4-hydroxyphenyl)propane, 2,4-bis(4-hydroxyphenyl)-2-methylbutane and 1,1-bis(4hydroxyphenyl)cyclohexane. Particularly preferred are 2,2-bis(4-hydroxyphenyl)propane and 1,1-bis(4-hydroxyphenyl)cyclohexane, and also 1,1-bis(4-hydroxyphenyl)-3,3,5-trimethylcyclohexane.

Both homopolycarbonates and copolycarbonates are suitable for use as component A. In addition to bisphenol A homopolymer, the copolycarbonates of bisphenol A are preferred.

The suitable polycarbonates may be branched in known manner, preferably by the incorporation of from 0.05 to 2.0 mol %, based on the sum of diphenols used, of at least trifunctional compounds, such as those containing three or more phenolic OH groups.

Particularly suitable polycarbonates have been found to be those having relative viscosities $\eta_{rel}$ of from 1.10 to 1.50, particularly from 1.25 to 1.40. This corresponds to average molecular weight $M_w$ (weight average) of from 10,000 to 200,000, preferably from 20,000 to 80,000.

The diphenols of the general formula I are known per se or can be manufactured by known processes.

The preparation of the polycarbonates can take place, for example, by effecting reaction of diphenols with phosgene in the interface process or with phosgene in the homogeneous phase process (so-called pyridine process), the molecular weight required in each case being attained in known manner by adding an appropriate amount of known chain stopper. (For information on polydiorganosiloxane-containing polycarbonates see for example DE-OS 3,334,782).

Suitable chain stoppers are for example phenol, p-tert-butylphenol and also long-chain alkylphenols such as 4-(1,3-tetramethylbutyl)phenol, according to DE-OS 2,842,005, or monoalkylphenols or dialkylphenols having a total of from 8 to 20 carbon atoms in the alkyl substituents according to DE-A 3,506,472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

'Halogen-free polycarbonates' means, for the purposes of the present invention, that the polycarbonates are composed of halogen-free diphenols, halogen-free chain stoppers and optionally halogen-free branching agents, whilst the content of minor ppm concentrations of saponifiable chlorine, resulting for example from the preparation of the polycarbonates with phosgene by the interface process, are not to be ragarded as 'halogen-containing' for the purposes of the present invention. Such polycarbonates having ppm contents of saponifiable chlorine are 'halogen-free polycarbonates' for the purposes of the present invention.

Component B

One or a mixture of two or more different graft polymers are used as component B in the molding compositions of the invention, preferably in amounts of from 1 to 97.35 wt %, based on the total weight of the molding composition. Particularly preferred molding compositions of the invention contain from 2 to 50 wt %, based on the total weight of the molding composition, of at least one graft polymer B. According to the invention, the graft polymers B are based on an elastomer having a glass transition point below 10° C., preferably below 0° C.

By an elastomer we also mean, for the purposes of the present invention, mixtures of different elastomers. Suitable elastomers are natural rubbers or synthetic rubbers, eg diene rubbers, acrylate rubbers or siloxane rubbers. Of these, acrylate rubbers are preferred.

The particularly preferred graft polymers B are composed of $b_1$) from 40 to 80 wt %, preferably from 50 to 70 wt %, of a graft base of a rubber-elastic polymer based on alkyl acrylates having from 1 to 8 carbon atoms in the alkyl radical and having a glass transition point below 0° C.

$b_2$) from 20 to 60 wt %, preferably from 30 to 50 wt %, of a graft component of $b_{21}$) from 60 to 95 wt %, preferably from 70 to 85 wt %, of styrene or substituted styrenes of the general formula II

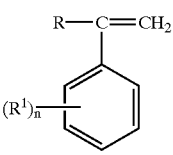

in which R denotes a $C_1$–$C_8$ alkyl radical, preferably methyl or ethyl, or hydrogen and $R^1$ denotes a $C_1$–$C_8$ alkyl radical, preferably methyl or ethyl, and n has the value 1, 2 or 3, or mixtures thereof and $b_{22}$) from 5 to 40 wt %, preferably from 15 to 30 wt %, of at least one unsaturated nitrile, preferably acrylonitrile or methacrylonitrile or mixtures thereof.

Particularly preferred suitable polymers for the graft base $b_1$ are polymers whose glass transition temperature is below −20° C. These are eg elastomers based on $C_1$–$C_8$ alkyl esters of acrylic acid, which may optionally contain further comonomers.

We prefer graft bases be which are composed of $b_{11}$) from 70 to 99.9 wt % of at least one alkyl acrylate having from 1 to 8 carbon atoms in the alkyl radical, preferably n-butyl acrylate and/or 2-ethylhexyl acrylate, particularly n-butyl acrylate as the only alkyl acrylate, $b_{12}$) from 0 to 30 wt % of a further copolymerizable monoethylenically unsaturated monomer, such as butadiene, isoprene, styrene, acrylonitrile, methyl methacrylate or vinylmethyl ether or mixtures thereof, $b_{13}$) from 0.1 to 5 wt % of a copolymerizable, polyfunctional, preferably bifunctional or trifunctional, cross-linking monomer, the percentages by weight being based on the total weight of the graft base.

In another preferred embodiment the graft base can be composed of from 66 to 79 wt % of $b_{11}$), from 20 to 30 wt % of $b_{12}$) and from 1 to 4 wt % of $b_{13}$), the percentages by weight being based on the total weight of the graft base.

Suitable bifunctional or polyfunctional cross-linking monomers $b_{13}$) are monomers which contain preferably two, optionally three or more, ethylenic double bonds which are capable of copolymerization and are not conjugated in the 1,3 positions. Suitable cross-linking monomers are for example divinylbenzene, diallyl maleate, diallyl fumarate, diallyl phthalate, triallyl cyanurate or triallyl isocyanurate. A particularly advantageous cross-linking monomer has been found to be the acrylate of tricyclodecenyl alcohol (cf DE-A 1,260,135).

This type of graft base is known per se and is described in the literature, for example in DE-A 3,149,358.

Of the graft components $b_2$ those are preferred in which $b_{21}$ is styrene or α-methylstyrene or a mixture thereof and $b_{22}$ is acrylonitrile or methacrylonitrile. The most preferred monomer mixtures used are styrene and acrylonitrile or α-methylstyrene and acrylonitrile. The graft components are obtainable by copolymerization of the components $b_{21}$ and $b_{22}$.

The manufacture of the graft base $b_1$ of the graft polymers B, which is composed of the components $b_{11}$ and optionally $b_{12}$ and $b_{13}$, is known per se and is described in, for example, DE-A 2,826,925, DE-A 3,149,358 and DE-A 3,414,118.

The preparation of the graft polymers B can be carried out, for example, by the method described in DE-PS 1,260, 135.

The synthesis of the graft component (graft shell) of the graft polymers can take place in one, two or three stages.

In the case of a single-stage synthesis of the graft shell, a mixture of the monomers $b_{21}$ and $b_{22}$ is polymerized in the desired ratio, by weight, ranging from 95:5 to 50:50, preferably from 90:10 to 65:35 in the presence of the elastomer $b_1$, in known manner (cf eg DE-OS 2,826,925), preferably in emulsion.

In the case of a two-stage synthesis of the graft shell $b_2$, the first stage in general forms 20 to 70 wt %, preferably 25 to 50 wt %, based on $b_2$. For preparation thereof there are preferably used only styrene or substituted styrenes or mixtures thereof ($b_{21}$).

The second stage of the graft shell generally forms from 30 to 80 wt %, particularly from 50 to 75 wt %, based, in each case, on $b_2$. For the preparation thereof there are used mixtures of the monomers $b_{21}$ and the nitrites $b_{22}$ in a ratio by weight of $b_{21}$ to $b_{22}$ of in general from 90:10 to 60:40, particularly from 80:20 to 70:30.

The conditions of the graft polymerization are preferably such that particle sizes of from 50 to 700 nm ($d_{50}$ value of the integral mass distribution) result. Measures to effect this end are known and are described, eg, in DE-OS 2,826,925.

Using the seed latex process it is possible to directly prepare a coarse rubber dispersion.

In order to make the products as tough as possible, it is frequently advantageous to use a mixture of at least two graft polymers showing different particle sizes.

To achieve this end, the particles of the rubber are enlarged in known manner, eg by agglomeration, so that the latex has a bimodal structure (50 to 180 nm and 200 to 700 nm).

In a preferred embodiment, a mixture of two graft polymers having particle sizes ($d_{50}$ value of the integral mass distribution) of from 50 to 180 nm and from 200 to 700 nm respectively is used in a ratio, by weight, of from 70:30 to 30:70.

The chemical structure of the two graft polymers is preferably the same, although the shell of the coarse graft polymer may, in particular, have a two-stage structure, if desired.

Mixtures of the components A and B; where the latter has one coarse graft polymer and one finely divided graft polymer, are described, eg, in DE-OS 3,615,607. Mixtures of the components A and B, in which the latter has a two-stage graft shell, are disclosed in EP-A 111,260.

In addition to the ASA rubbers mentioned above, the rubbers modified with oxazoline groups and described in DE-A 1-14606198 are also suitable.

The component B can also be a mixture of the aforementioned graft polymers with one or more different network rubbers. In this case, the content of the network rubbers, based on the total weight of the molding compositions of the invention, can be up to 20 wt %, preferably of from 1 to 15 wt %.

We prefer network rubbers based on siloxanes and acrylates or methacrylates.

The preferred network rubbers generally contain $\beta_1$) from 30 to 95 wt %, preferably from 40 to 90 wt %, of a network serving as graft base, composed of $\beta_{11}$) from 10 to 90 wt %, preferably from 20 to 80 wt %, of at least one polyorganosiloxane and $\beta_{12}$) from 10 to 90 wt %, preferably from 20 to 80 wt %, of a polyalkyl acrylate or a polyalkyl methacrylate or a mixture thereof and $\beta_2$) from 5 to 70 wt %, preferably from 10 to 60 wt %, of a graft component.

Preferred polysiloxanes are derived from cyclic organosiloxanes preferably containing from three to six silicon atoms. Examples of suitable siloxanes are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenyl-cyclotetrasiloxane or octaphenylcyclotetrasiloxane. The polysiloxanes may be composed of one organosiloxane or a number of different organosiloxanes.

In addition, the polyorganosiloxanes $\beta_{11}$ usually contain from 0.1 to 30 wt %, based on $\beta_{11}$, of at least one cross-linking agent. Trifunctional or tetrafunctional silanes such as trimethoxymethylsilane, triethoxyphenylsilane, tetramethoxysilane, tetraethoxysilane, tetra-n-propoxysilane or tetrabutoxysilane may be used as cross-linking agents. Of these, tetrafunctional silanes are particularly preferred.

Furthermore, the polyorganosiloxanes generally contain from 0 to 10 wt %, based on $\beta_{11}$, of graftable monomers. The graftable monomers used can be, for example, unsaturated silanes.

Preferred graftable monomers are the methacryloylsilanes. As examples thereof the following may be mentioned:

β-methacryloyloxyethyldimethoxymethylsilane
γ-methacryloyloxypropylmethoxydimethylsilane
γ-methacryloyloxypropyldimethoxymethylsilane
γ-methacryloyloxypropyltrimethoxysilane
γ-methacryloyloxypropylethoxydiethylsilane
γ-methacryloyloxypropyldiethoxymethylsilane
δ-methacryloyloxybutyldiethoxymethylsilane.

Processes for the preparation of polyorganosiloxanes are described, for example, in U.S. Pat. No. 2,891,920 or U.S. Pat. No. 3,294,725. The polyorganosiloxanes are preferably made by mixing, in a solvent under shear, a mixture of organosiloxanes, the cross-linking agent and, if desired, the graftable monomers, with water in the presence of an emulsifier such as an alkylsulfonic acid or preferably an alkylbenzenesulfonic acid. The emulsifier may, if desired, be a metal salt of the alkylsulfonic acid or alkylbenzenesulfonic acid.

The polyalkyl acrylates or polyalkyl methacrylates $\beta_{12}$ contain, as monomeric building blocks, generally alkyl acrylates or methacrylates or mixtures thereof, cross-linking agents and graftable monomers, where the cross-linking agents and graftable monomers can in each case be used alone or together. The content of cross-linking agent and graftable monomer together is usually in the range of from 0.1 to 20 wt %, based on $\beta_{12}$.

Examples of suitable alkyl acrylates or alkyl methacrylates are methyl acrylate, ethyl acrylate, n-propyl acrylate, n-butyl acrylate, 2-ethylhexyl acrylate, hexyl methacrylate, 2-ethylhexyl methacrylate or n-lauryl methacrylate. We particularly prefer to use n-butyl acrylate.

The cross-linking agent can be, for example, ethylene glycol dimethacrylate, propylene glycol dimethacrylate, 1,3-butylene glycol dimethacrylate or 1,4-butylene glycol dimethacrylate.

Allyl methacrylate, triallyl cyanurate or triallyl isocyanurate are examples of suitable graftable monomers. Of these, allyl methacrylate can also act as cross-linking agent.

The preparation of the network is effected by adding the monomer building blocks of the component $\beta_{12}$ to the polyorganosiloxane $\beta_{11}$, which is neutralized by the addition of an aqueous solution of a base such as sodium hydroxide, potassium hydroxide or calcium hydroxide. By this means the polyorganosiloxane swells. Subsequent conventional free-radical starters are added. During the polymerization reaction there is formed a network, in which there is mutual penetration of the components $\beta_{11}$ and $\beta_{12}$. The networks can also be linked with each other via chemical bonds.

We very particularly prefer networks in which the polyorganosiloxane has a backbone of dimethyl siloxane and $\beta_{12}$ is a polyalkyl acrylate whose backbone is composed of n-butyl acrylate.

The gel content of the network is usually more than 80% (measured by extraction with toluene at 90° C. over a period of 12 h).

The graft component $\beta_2$ is usually composed of vinyl monomers. These, include styrene, α-methylstyrene, vinyl toluene, acrylates, eg methyl acrylate, ethyl acrylate or n-butyl acrylate, methacrylates such as methyl methacrylate or 2-ethyl methacrylate, nitriles, such as acrylonitrile or methacrylonitrile. The vinyl monomers can be used alone. Alternatively, mixtures of different monomers can be used. In this case the monomers are generally such as to give a graft component having a glass transition temperature of at least 80° C., preferably in the range of from 80° to 110° C. (determined by taking a torsion pendulum reading at a frequency of 1 Hz and a heating rate of 10° C./min ). Particularly preferred are graft components having a predominant content of methyl methacrylate, preferably graft components containing at least 85 wt % of methyl acrylate. We particularly prefer graft components having a content of methyl methacrylate of from 95 to 100 wt %. In addition to methyl methacrylate, styrene, n-butyl acrylate or cyclohexyl methacrylate are preferably used. Most preferably, methyl methacrylate is used alone.

Component C

The molding compositions of the invention contain, as component C, preferably from 1 to 97.35 wt %, based on the total weight of the molding composition, of one or a mixture of two or more different copolymers containing vinylaromatic monomers. Particularly preferred molding compositions of the invention contain component C in amounts of from 2 to 50 wt %, based on the total weight of the molding composition. We prefer copolymers based on styrene or substituted styrenes and unsaturated nitriles.

Suitable copolymers are both random copolymers and block copolymers. Examples of suitable copolymers are poly(styrene-co-acrylonitrile) or terpolymers based on styrene, acrylonitrile and N-phenylmaleimide or oxazoline group-containing copolymers.

The copolymers C are more preferably composed of $C_1$) from 60 to 95 wt %, preferably from 65 to 85 wt %, of styrene or substituted styrenes of the general formula I or mixtures thereof and $C_2$) from 5 to 40 wt %, preferably from 15 to 35 wt %, of at least one unsaturated nitrile, preferably acrylonitrile or methacrylonitrile or mixtures thereof.

The copolymers C are resinous, thermoplastic and free from rubber. Particularly preferred copolymers C are those of styrene and acrylonitrile, of α-methylstyrene and acrylonitrile or of styrene, α-methylstyrene and acrylonitrile.

Such copolymers are frequently produced as by-products during the graft polymerization carried out for the preparation of component B, particularly when large amounts of monomers are grafted onto small amounts of rubber.

The copolymers C are known per se and can be prepared by free radical polymerization, particularly by the use of emulsion, suspension, solution and mass polymerization methods. They have viscosity numbers in the range of from 40 to 160, preferably from 60 to 110 mL/g (measured in 0.5 wt % strength solution in dimethyl formamide at 23° C.), which correspond to average molecular weights $M_w$ (weight average) of from 40,000 to 2,000,000.

Processes for the preparation of oxazoline group-containing polymers are likewise known per se. Oxazoline group-containing copolymers can be prepared, eg, by causing the reaction of nitrile group-containing copolymers with a monoamino alcohol, preferably in the presence of a catalyst such as a zinc or cadmium salt (cf eg DE-A1-19, 606,198).

Component D

A further component of the molding compositions of the invention comprises a filler or, a mixture of two or more fillers. These are usually present in amounts of from 0.5 to 25 wt %, particularly from 1 to 20 wt %, based on the total weight of the molding compositions.

Examples of fibrous fillers are carbon fibers, potassium titanate whiskers, aramide fibers and, more preferably, glass fibers. When use is made of glass fibers these may be dressed with a sizing substance and an adhesion promoter to improve their compatibility with the matrix material. Generally, the carbon fibers and glass fibers used have a diameter in the range of from 6 to 20 μm.

The glass fibers may be incorporated either in the form of milled glass fibers or in the form of rovings. In the finished injection molded article the average length of the glass fibers is preferably in the range of from 0.08 to 0.5 mm.

Carbon or glass fibers can also be used in the form of fabrics, mats or glass-fiber rovings.

Suitable particulate fillers are amorphous silicic acid, carbonates such as magnesium carbonate (chalk), pulverized quartz, mica, a wide variety of silicates such as clays, muskovite, biotite, suzoite, tin maletite, talcum, chlorite, phlogopite, felspar, calcium silicates such as wollastonite or aluminum silicates such as kaolin, particularly calcined kaolin.

In a particularly preferred embodiment, particulate fillers are used, of which at least 95 wt %, preferably at least 98 wt %, of the particles have a diameter (largest dimension), determined on the finished product, of less than 45 μm, preferably less than 40 μm, and their so-called aspect ratio is in the range of from 1:1 to 25:1, preferably in the range of from 2:1 to 20:1, determined on the finished product.

The particle size can be determined, eg, by making electronic microscope photographs of thin sections of the polymer mixture and evaluating at least 25, preferably at least 50, particles of the filling material. Determination of the particle sizes may also be effected via sedimentation analysis, as described in Transactions of ASAE, page 491 (1983). The amount of filler having a diameter below 40 μm can also be measured by screen analysis. The aspect ratio is the ratio of particle size to thickness (largest dimension to smallest dimension).

Particularly preferred particulate fillers are talcum, kaolin, such as calcined kaolin or wollastonite or mixtures of two or all of these fillers. Of these, talcum having a content of at least 95 wt % of particles with a diameter of less than 40 μm and an aspect ratio of from 1.5 to 25, determined, in each case, on the finished product, is particularly preferred. Kaolin preferably has a content of at least 95 wt % of particles with a diameter of less than 20 μm and an aspect ratio of from 1.2 to 20, both determined on the finished product.

We mostly prefer to use particulate fillers as the only fillers.

Component E

According to the invention, the molding compositions contain one, or a mixture of two or more different, low molecular weight halogen-free acid(s) as component E. The content of this component in the molding compositions is generally from 0.05 to 2 wt %, preferably from 0.1 to 1.8 wt %, based on the total weight of the molding compositions.

For the purposes of the present invention, 'low molecular weight' is taken to refer to up to polynuclear, for example up to pentanuclear compounds, particularly monomolecular compounds.

According to the invention the acids are halogen-free, ie they contain no halogens in the molecular framework. Acids having slight halogen containing impurities are however included for the purposes of the invention.

For the purposes of the present invention, the term 'acids' is taken to include their hydrates.

Advantageously, acids are used which are only slightly volatile or non-volatile at the processing temperatures or do not decompose at temperatures of up to approximately 300° C.

The acids can contain one, two or more, eg up to ten, acid groups.

Preferably organic acids are used. Both aromatic and aliphatic acids are suitable. Use may also be made of aliphatic/aromatic acids. The preferred acids include palmitic acid, stearic acid, benzoic acid, isophthalic acid, terephthalic acid, trimellitic acid, sulfonic acids such as p-toluenesulfonic acid, fumaric acid, citric acid, mandelic acid or tartaric acid.

Particularly preferred acids used are citric acid or p-toluenesulfonic acid or mixtures thereof. For example, the proportion, by weight, of citric acid therein can be from 1 to 99%, preferably from 10 to 90% and that of p-toluenesulfonic acid conversely from 99 to 1% and preferably from 90 to 10%.

Component F

According to the invention, the molding compositions contain one, or a mixture of two or more different, poly(alkyl)acrylate(s). Generally the poly(alkyl)acrylates are present in the molding compositions in concentrations of from 0 to 10 wt %, preferably from 0.5 to 5 wt %, based on the total weight of the molding compositions.

Suitable components F are both homopolymers and copolymers such as random or block copolymers based on alkyl acrylates or methacrylates or mixtures thereof.

In one preferred embodiment, poly(alkyl)acrylates are used which are compatible with component C.

The 'compatibility' of two polymer components usually refers to the miscibility of the components or the tendency of one of the polymers to dissolve in the other polymer components (cf B. Vollmert, Grundriss der makromolekularen Chemie, Vol. IV, pp 222 et seq, E. Vollmert Verlag 1979). The solubility of two polymers can be indirectly determined for example by taking torsion pendulum, DTA or DSC readings, by observing the optical clarity of mixtures thereof or by means of nuclear magnetic resonance (NMR) relaxation methods.

Particularly preferred are copolymers which are composed of at least two different alkyl esters, aromatic or alkyl aromatic esters of acrylic acid or methacrylic acid or mixtures thereof.

The esters generally have from 1 to 10, preferably from 1 to 8, carbon atoms in the alkyl radical. The alkyl radical may be linear or branched. The alkyl radicals include methyl, ethyl, n-propyl, isopropyl, n-butyl, isobutyl, tert-butyl, n-pentyl, 2-ethylhexyl or cyclohexyl. Preferably use is made of methyl methacrylate, cyclohexyl methacrylate, n-butyl acrylate or 2-ethylhexyl acrylate. Preferred suitable aromatic esters are esters having from 6 to 18 carbons, especially phenyl. Particularly preferred are polyalkyl acrylates F which contain from 70 to 99 wt %, particularly from 80 to 93 wt %, of methyl methacrylate and from 1 to 30 wt %, particularly from 7 to 20 wt %, of n-butyl acrylate.

Particularly preferred are polyalkyl acrylates F having a high molecular weight. They usually have molecular weights (weight average $M_w$) of at least 1,000,000 g/mol (measured by gel permeation chromatography in tetrahydrofuran against a polystyrene standard). Preferred polyalkyl acrylates E have molecular weights $M_w$ of 1,100,000 g/mol or higher, for example at least 1,200,000 g/mol. Generally, the copolymers F have a glass transition temperature in the range of from 40° to 125° C., preferably 70° to 120° C. (determined by DSC measurement at a heating rate of 10 K/min, second cycle following heating to 175° C. and cooling to room temperature).

The poly(alkyl)acrylates are known per se or can be synthesized by methods known per se. For example, they can be prepared by the suspension polymerization process described in H. G. Elias, Makromoleküle, 4th Edition 1981, Hüthig & Wopf Verlag, Basel.

Component G

Optionally, the molding compositions of the invention can contain a flame retardant or a mixture of two or more different flame retardants. These are generally present in concentrations of from 0 to 25 wt %, preferably from 1 to 20 wt %, based on the total weight of the molding composition.

More preferably use is made of halogen-free flame retardants. Basically all phosphorous flame retardant are particularly suitable.

For example, use can be made of halogen-free phosphorus compounds of the general formula III.

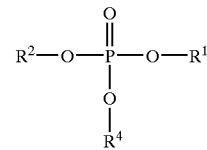

III in which $R^2$, $R^3$ and $R^4$ are the same or different and independently denote halogen-free $C_1$–$C_8$ alkyl groups or halogen-free $C_6$–$C_{20}$ aryl groups, which may be monosubstituted or disubstituted by $C_1$–$C_4$ alkyl groups.

Examples of particularly suitable phosphorus compounds of the general formula III are tri(2,6-dimethylphenyl) phosphate, triphenyl phosphate, tricresyl phosphate, diphenyl-2-ethylcresyl phosphate, diphenylcresyl phosphate and tri(isopropylphenyl) phosphate.

In order to achieve an elevated Vicat temperature of the molding compositions, mixtures of the aforementioned phosphates with for example triphenylphosphine oxide or tri(2,6-dimethylphenyl)phosphine oxide can also be used, or the said phosphine oxides may be used alone.

Furthermore, the addition of the phosphates mentioned in DE-A 3,824,356, such as bisphenyl(4-phenylphenyl) phosphate, phenyl-bis(4-phenylphenyl) phosphate, tris(4- phenylphenyl) phosphate, bisphenyl(benzylphenyl) phosphate, phenyl-bis(benzylphenyl) phosphate, tris(benzylphenyl) phosphate, phenyl-bis[(1-phenylethyl)phenyl]phosphate, phenyl-bis[(1-methyl-1-phenylethyl)phenyl]phosphate and phenyl-bis[4-(1-phenylethyl)-2,6-dimethylphenyl]phosphate is a suitable measure to increase the Vicat temperature of the molding compositions.

These halogen-free phosphorus compounds G are generally known (cf for example Ullmann, Enzyklopaedie der technischen Chemie, Vol. 18, pp 301 et seq, 1979, Houben Weyl, Methoden der organischen Chemie, Vol. 12/1, pp 43, pp 136; Beilstein, Vol. 6, pp 177).

In addition, phosphates containing more than one P atom per molecule are suitable for use as component G. Examples are monomeric or oligomeric phosphorus compounds of the formulas IV, V or VI

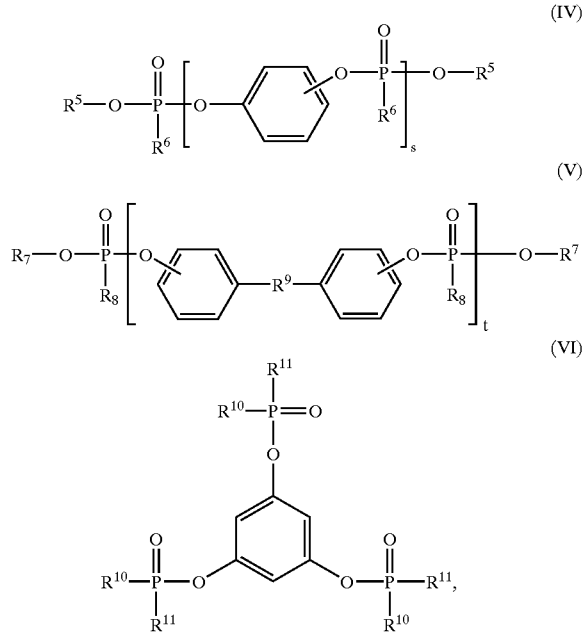

in which

| | |
|---|---|
| $R^5$ and $R^7$ | independently stand for optionally substituted alkyl or aryl; |
| $R^6$, $R^8$, $R^{10}$ and $R^{11}$ | independently stand for optionally substituted alkyl, aryl, alkoxy or aryloxy; |
| $R^9$ | stands for alkylene, $-SO_2-$, $-CO-$, $-N=N-$ or $-(R^{12})P(O)-$, in which $R^{12}$ stands for optionally substituted alkyl, aryl or alkylaryl |
| and | |
| s and t | independently denote an average, or integral, value of from 1 to 30. |

'Optionally substituted' means that the groups can have one to five, preferably one or two, substituents, which substituents in compounds of the formulas IV, V and VI are suitably cyano, hydroxy or $C_{1-4}$ alkyl.

Preferred alkyl radicals in compounds of the formulas IV, V and VI are $C_{1-20}$ alkyl, such as methyl, ethyl, n-propyl, n-butyl, neopentyl, n-hexyl, n-octyl, n-nonyl, n-dodecyl, 2-ethylhexyl or 3,5,5-trimethylhexyl. Also preferred is cyanoethyl.

Preferred aryl radicals in compounds of the formulas IV, V and VI are phenyl or naphthyl and also monosubstituted or polysubstituted radicals, such as tolyl, xylyl, mesityl or cresyl.

Preferred alkylaryl radicals in compounds of the formulas IV, V and VI are $C_{1-20}$ alkylaryl and especially $C_{1-12}$ alkylaryl radicals in which the alkyl moiety and the aryl moiety are as defined above.

Preferred alkoxy radicals in compounds of the formulas IV, V and VI are $C_{1-20}$ alkoxy radicals in which the $C_{1-20}$ alkyl moiety is as defined above.

Preferred aryloxy radicals in compounds of the formulas IV, V and VI are those in which the aryl moiety is as defined above.

Preferred alkylene radicals in compounds of the formulas IV, V and VI are $C_{1-6}$ alkylene radicals, such as methylene, ethylene, n-propylene or n-hexylene.

These compounds are preferably synthesized by base-catalyzed transesterification or by the reaction of phosphorus oxychloride with phenols catalyzed with magnesium or aluminum chloride. We prefer to use the commercially available products based on resorcinoldiphenyl phosphate and also the commercially available reaction products of bisphenol A and triphenyl phosphate.

In this case one should be aware of the fact that the commercially available products are usually mixtures of different oligomers or isomers.

Furthermore, mixtures of higher phosphates and monophosphates or monophosphine oxides can be used in any desired proportions.

Phosphates which can be used as component G are also those of the formula VII

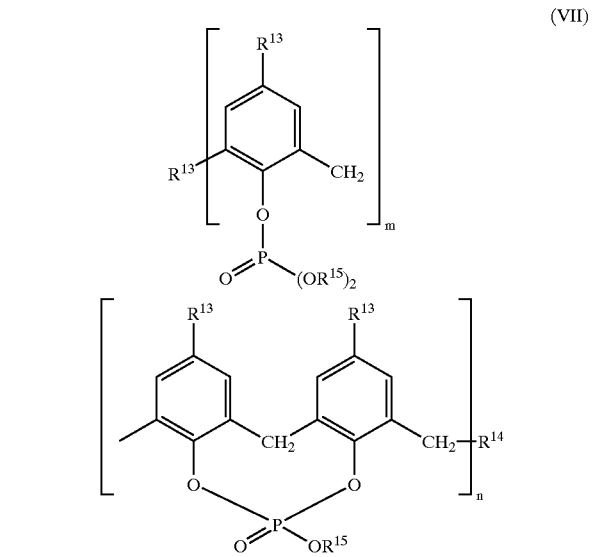

in which $R^{13}$ denotes hydrogen or alkyl having from 1 to 8 carbon atoms, preferably methyl, and $R^{14}$ denotes

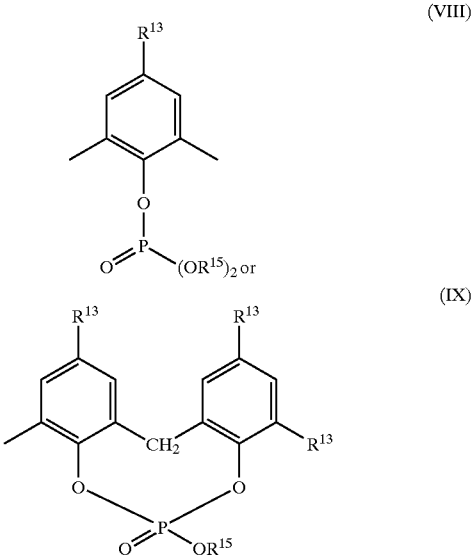

in which
$R^{15}$ denotes phenyl, which may be substituted by alkyl having from 1 to 4 carbon atoms, or by phenyl, benzyl or 2-phenylethyl, and
when m is zero, n must be at least 1 and
$R^{14}$ must be a radical of the formula IX, and
when n is zero, m is at least 2 and
$R^{14}$ must be a radical of the formula VIII,
and in which m is an integer from 0 to 12 and n is an integer from 0 to 5,
where the nucleus index of the polyphenol molecule, that is to say the number of benzene rings in compound VII, not counting the radicals $R^{13}$ to $R^{15}$, is not higher than 12.

Examples of phosphates of formula VII are the phosphates of novolaks. Suitable novolaks are condensation products of formaldehyde and phenols.

Characteristic examples of phenols are phenol, o-cresol, m-cresol, p-cresol, and 2,5-dimethyl, 3,5-dimethyl, 2,3,5-trimethyl, 3,4,5-trimethyl, p-tert-butyl, p-n-octyl, p-stearyl, p-phenyl, p-(1-phenylethyl), 1-phenylethyl o-isopropyl, p-isopropyl or m-isopropyl phenols.

We prefer to use phenol, o-cresol, p-cresol, p-tert-butylphenol and o-tert-butylphenol and p-octylphenol.

Alternatively, mixtures of these phenols can be used. The preferred novolaks used are phenol/formaldehyde novolak, o-cresol/formaldehyde novolak, m-cresol/formaldehyde novolak, p-cresol/formaldehyde novolak, tert-butylphenol/formaldehyde novolak or o-octylphenol/formaldehyde novolak.

The phosphorus compounds of formula (VII) which are suitable for use in the present invention can generally be prepared by known methods. (For information on novolaks see Houben-Weyl, Methoden der organischen Chemie, Vol. XIV/2, pp 193 to 292, and Ullmanns Encyclopaedie der technischen Chemie, 4th edition, Vol. 18, pp 245 to 257; and for information on phosphates see for example Ullmanns Encyclopaedie der technischen Chemie, Vol. 12/1, pp 299 to 374).

Component H

The molding compositions of the invention may also contain an additive or a mixture of different additives in amounts of from 0 to 20 wt %, preferably from 1 to 15 wt %, based on the total weight of the molding composition.

Suitable components H are additives which are typical for, and commonly used in, polycarbonate molding compositions, such as colorants, eg pigments, optical brighteners or fluorescent dyes, antistatic agents, antioxidants, such as sterically hindered phenols, particularly tetrakis [methylene(3,5-di-tert-butyl-4-hydroxyhydroquininamate)] methane or 3,5-di-tert-butyl-4-hydroxyhydrocinnamate, UV stabilizers, adhesion promoters, release agents, such as long-chain fatty acid esters, or lubricants. The UV stabilizers used can suitably be eg phosphites, hypophosphites or phosphonites. Of these, phosphites are preferred in which the three organic radicals are sterically hindered phenols, such as tri(2,4-di-tert-butylphenyl) phosphite. These and other UV stabilizers and antioxidants suitable for use as component H and also processes for the preparation thereof are described in DE-A1 4,419,897.

Component I

The molding compositions of the invention contain, as component I, at least one aromatic or partially aromatic polyester or a mixture thereof. The molding compositions of the invention generally contain component I in amounts ranging from 0.1 to 10 wt % and preferably from 0.5 to 8 wt %, based on the total weight of the molding composition.

For the purposes of the present invention, 'aromatic polyesters' are taken not to mean polycarbonates such as can be used as component A. The said aromatic polyesters are derived from aromatic dihydroxy compounds and aromatic dicarboxylic acids or aromatic hydroxycarboxylic acids.

Suitable aromatic dihydroxy compounds are the above compounds of the general formula I described under A.

The preferred dihydroxy compounds include dihydroxydiphenyl, di(hydroxyphenyl)alkanes, di(hydroxyphenyl)cycloalkanes di(hydroxyphenyl)sulfide, di(hydroxyphenyl) ether, di(hydroxyphenyl) sulfoxide, α,α-di(hydroxyphenyl)dialkylbenzene, di(hydroxyphenyl) sulfone, di(hydroxyphenyl)benzene, resorcinol and hydroquinone and the nuclealkylated derivatives thereof. Of these, the following are particularly preferred: 4,4'-dihydroxydiphenyl, 2,4-di(4'-hydroxyphenyl)-2-methylbutane, α,α-di(4-hydroxyphenyl)-p-diisopropylbenzene, 2,2-di(3'-methyl-4'-hydroxyphenyl) propane and 2,2-di(3'-chloro-4'-hydroxyphenyl)propane and especially 2,2-di(4'-hydroxyphenyl)propane, 2,2-di(3',5'-dichlorodihydroxyphenyl)propane, 1,1-di(4'-hydroxyphenyl)cyclohexane, 3,4'-dihydroxybenzophenone, 4,4'-dihydroxydiphenylsulfone and 2,2-di(3',5'-dimethyl-4'-hydroxyphenyl)propane and mixtures thereof.

It is of course possible to use mixtures of polyalkylene terephthalates and fully aromatic polyesters. These generally contain from 20 to 98 wt % of polyalkylene terephthalate and from 2 to 80 wt % of fully aromatic polyester.

The aromatic dicarboxylic acids generally have from 8 to 30 carbon atoms. The aromatic ring(s) can be substituted with, for example, one or more $C_1$–$C_4$ alkyl radicals such as methyl, ethyl, n-propyl, isopropyl, n-butyl, isobutyl or tert-butyl. Preferred aromatic dicarboxylic acids that may be mentioned are terephthalic acid, isophthalic acid and 2,6-naphthalenedioic acid. We prefer to use mixtures comprising from 5 to 100 mol % of isophthalic acid and from 0 to 95 mol % of terephthalic acid, more preferably mixtures of from 20 to 50 mol % of isophthalic acid and from 50 to 80 mol % of terephthalic acid.

Partially aromatic polyesters I are those based on aromatic dicarboxylic acids and one or more different aliphatic dihydroxy compounds.

One group of preferred partially aromatic polyesters are polyalkylene terephthalates containing from 2 to 10 carbon atoms in the alcohol moiety.

Such polyalkylene terephthalates are known per se and are described in the literature. They contain one aromatic ring in the backbone, which is derived from the aromatic dicarboxylic acid as described above.

These polyalkylene terephthalates can be prepared by causing aromatic dicarboxylic acids, esters thereof or some other ester-forming derivatives to react with aliphatic dihydroxy compounds in conventional manner.

Examples of suitable dicarboxylic acids are 2,6-dinaphthalenedioic acid, terephthalic acid and isophthalic acid or mixtures thereof. Up to 30 mol %, and preferably not more than 10 mol %, of the dicarboxylic acids may be replaced by aliphatic or cycloaliphatic dicarboxylic acids such as adipic acid, azelaic acid, sebacic acid, dodecane dioic acid and cyclohexanedioic acid.

Of the aliphatic dihydroxy compounds, use is preferably made of diols containing from 2 to 6 carbon atoms, in particular ethane-1,2-diol, butane-1,4-diol, hexane-1,6-diol, hexane-1,4-diol, cydohexane-1,4-diol, cyclohexane-1,4-dimethylol and neopentyl glycol or mixtures thereof.

As examples of particularly preferred partially aromatic polyesters (I) there may be mentioned polyalkylene terephthalates derived from alkanediols containing from 1 to 6 carbon atoms. Of these, polyethylene terephthalate and polybutylene terephthalate or mixtures thereof are particularly preferred.

The viscosity number of the polyesters (I) is generally in the range of from 70 to 220, preferably 100 to 150 (measured on a 0.5 wt % strength solution in a 1:1 w/w mixture of phenol and o-dichlorobenzene at 25° C.).

We particularly prefer polyesters whose content of carboxylene end groups is up to 100 mval/kg, preferably up to 50 mval/kg and more preferably up to 40 mval/kg of polyester. Such polyesters can be prepared, for example, by the method described in DE-A 4,401,055. The content of carboxylene end groups is usually determined by titration methods (eg potentiometry).

The preparation of the molding compositions of the invention is effected by processes known per se involving mixing of the components. It can be advantageous to premix individual components. The network rubbers of the component B can be added separately from the other graft polymers. It is also possible to mix the components in solution followed by removal of the solvent.

Suitable organic solvents for the components A to C and E to I and the additives H are for example chlorobenzene, mixtures of chlorobenzene and methylene chloride or mixtures of chlorobenzene and aromatic hydrocarbons, eg toluene.

Evaporation of the solvent mixtures can take place in, for example, evaporating extruders.

Mixing of the eg dry components A, B, C, D, E, F and I and optionally G and H can be effected by all known, methods. Preferably however, mixing of the components A, B, C, D, E, F and I and optionally G and H is effected at temperatures of from 200° to 320° C. by extruding, kneading or roller milling the components together, the components having been previously isolated, if necessary, from the solution obtained during polymerization or from the aqueous dispersion.

The thermoplastic molding compositions of the invention can be processed by known thermoplastics processing methods, ie, for example, by extrusion, injection molding, calendering, blow molding, compression molding or sintering.

The molding compositions of the invention can be used for the preparation of shaped articles, fibers or films.

Preferably, shaped articles are made from the molding compositions of the invention. The latter can be of small or large magnitude and intended for external or internal applications. Preferably, large shaped articles for the construction of vehicles, particularly in the motorcar industry, are made from the molding compositions of the invention. In particular, wheel boss caps or external autobody parts can be manufactured from the molding compositions of the invention. Specific examples which may be mentioned are mud guards, tail gates, hoods, load areas, covers for load areas, side walls for load areas or motorcar roofs, including removable or collapsible motorcar roofs or motorcar roof parts.

The molding compositions of the invention are distinguished by the fact that they are stable under processing conditions and are easy to process. The shaped articles made therefrom are dimensionally stable and show improved breaking characteristics at low temperatures compared with the prior art. In addition, the molding compositions satisfy stringent requirements as regards heat stability.

EXAMPLES

The average particle size and the particle size distribution were determined from the integral mass distribution. The average particle sizes were in all cases weight averages of the particle sizes, such as are determined by an analytical ultracentrifuge corresponding to the method proposed by W. Scholtan and H. Lange, Kolloid-Z, and Z.-Polymere 250 (1972), pp 782 to 796. The ultracentrifuge readings give the integral mass distribution of the particle size of a sample. From this the percentage, by weight, of the particles having a diameter equal to or less than a given size can be determined. The average particle size, also referred to as the $d_{50}$ value of the integral mass distribution, is defined as the particle size at which 50 wt % of the particles have a smaller diameter than the diameter corresponding to the $d_{50}$ value. In this case 50 wt % of the particles will then have a diameter greater than the $d_{50}$ value. To characterize the breadth of the particle size distribution of the rubber particles, use is made not only of the $d_{50}$ value (average particle size) but also of the $d_{10}$ and $d_{90}$ values provided by the integral mass distribution. The $d_{10}$ or $d_{90}$ values of the integral mass distribution are defined as for the $d_{50}$ value, except that they relate to 10% and 90 wt % of the particles respectively. The quotient $Q=(d_{90}-d_{10})/d_{50}$ represents a measure of the range of distribution of the particle sizes.

The following components were used:

$A^1$) a commercially available polycarbonate based on bisphenol A having a viscosity number of 61.3 mL/g, measured on a 0.5 wt % strength solution in methylene chloride at 23° C.

$B^1$) a finely divided graft polymer, prepared from $\gamma_1$) 16 g of butyl acrylate and 0.4 g of tricyclodecenyl acrylate, which were heated to 60° C. in 150 g of water with the addition of 1 g of the sodium salt of a $C_{12}$–$C_{18}$ paraffinsulfonic acid, 0.3 g of potassium persulfate, 0.3 g of sodium hydrogencarbonate and 0.15 g of sodium pyrophosphate with stirring. Ten minutes after the commencement of the polymerization reaction there were added over a period of 3 hours, a mixture of 82 g of butyl acrylate and 1.6 g of tricyclodecenyl acrylate. After all of the monomer had been added, stirring was continued for another hour. The latex of the cross-linked butyl acrylate polymer obtained had a solids content of 40 wt %. The average particle size (weight average) was found to be 76 nm and the particle size distribution was narrow (quotient Q=0.29).

γ₂) 150 g of the polybutyl acrylate latex obtained under γ₁) were mixed with 40 g of a mixture of styrene and acrylonitrile (ratio by weight 75:25) and 60 g of water and then, following the addition of a further 0.03 g of potassium persulfate and 0.05 g of lauroyl peroxide, stirred over a period of 4 hours at 65° C. Following termination of the graft copolymerization, the polymerization product was precipitated from the dispersion with calcium chloride solution at 95° C. and washed with water and dried in a warm stream of air. The degree of grafting of the graft copolymer was 35%, the particle size 91 nm.

B²) A coarsely divided graft polymer, prepared as follows:
γ₃) To an initial mixture of 1.5 g of the latex prepared under γ₁) there were added 50 g of water and 0.1 g of potassium persulfate and then, over a period of 3 hours, there was added a mixture of 49 g of butyl acrylate and 1 g of tricyclodecenyl acrylate as one stream and a solution of 0.5 g of the sodium salt of a $C_{12}$–$C_{18}$ paraffinsulfonic acid in 25 g water as another stream, at 60° C. Polymerization was then continued over a period of 2 hours. The resulting latex of the cross-linked butyl acrylate polymer had a solids content of 40%. The average particle size (weight average of the latex) was found to be 430 nm; the particle size distribution was narrow (Q=0.1).

γ₄) 150 g of the latex prepared under γ₃) were mixed with 20 g of styrene and 60 g of water and, following the addition of a further 0.03 g of potassium persulfate and 0.05 g of lauroyl peroxide, stirred over a period of 3 hours at 65° C. The dispersion obtained during this graft copolymerization was then polymerized with 20 g of a mixture of styrene and acrylonitrile in a ratio, by weight, of 75:25 for a further 4 hours. The reaction product was then precipitated from the dispersion by a calcium chloride solution at 95° C., separated, washed with water and dried in a warm stream of air. The degree of grafting of the graft copolymer was found to be 35%; the average particle size of the latex particles was 510 nm.

C¹) A copolymer of styrene and acrylonitrile in a ratio, by weight, of 81:19 and having a viscosity number of 72 mL/g (measured on a 0.5 wt % strength solution in dimethyl formamide at 23° C.), prepared by continuous solution polymerization following by a process as described, for example, in Kunststoff-Handbuch, Vieweg-Daumiller, Vol. V (Polystyrol), Card-Hanser-Verlag, Munich 1969, page 124, lines 12 et seq.

D¹) Talcum (IT-Extra sold by Norwegian Talc), characterized in that the average particle size ($X_{50}$ value) was 4.91 μm and the average particle size of 90% of all of the particles ($X_{90}$ value) was less than 10.82 μm determined by laser diffraction, the talcum being suspended in a suspension cell in a mixture of water and surfactant (VE-Wasser/CV-K8-Tensid 99:1, sold by CV Chemievertrieb, Hanover) using a magnetic stirrer at a speed of 60 rpm. The pH of the aqueous suspension was 8.5.

E¹) p-Toluenesulfonic acid hydrate, purity 98%, melting point 103° C.

E²) Citric acid hydrate, purity 99%.

F¹) A copolymer of 89 wt % of methyl methacrylate and 11 wt % of n-butyl acrylate, characterized by a molecular weight (weight average $M_w$) of 1,800,000 g/mol (determined by gel permeation chromatography in tetrahydrofuran against a polystyrene standard).

I¹) Polybutylene terephthalate (Ultradur® B4500 sold by BASF), characterized by a viscosity number of 130 (measured on a 0.5 wt % strength solution in a 1:1 mixture of phenol and o-dichlorobenzene).

Preparation of the Molding Compositions

The components listed in the table below were mixed in a twin-worm extruder (ZKS 30 sold by Werner und Pfleiderer) at 250° to 280° C., extruded and cooled and the extrudate was granulated. The dried granules were processed at 250 to 280° C. to standard small rods, ISO specimens and discs (60×3 mm) using a mold temperature of 80° C.

Utilitarian Tests

The heat deflection temperature of the samples was determined via the Vicat softening point. The Vicat softening point was determined on standard small rods as specified in DIN 53,460, using a force of 49.05 N and a temperature increase of 50 K per hour.

The flowability (MVI) of the molding compositions was determined as specified in DIN 53,735 at a temperature of 260° C. and under a load of 5 kg.

The notched impact strength ($a_k$) was determined as specified in ISO 179 1eA at room temperature.

The percentage elongation at break was determined as specified in ISO 527 at a rate of deformation of 50 mm/min at room temperature.

The total penetration energies $W_s$ [Nm] (average of five separate readings) were measured using the penetration test specified in DIN 53,443 at −30° C. Both the energy consumption and the deformation distance were determined.

The thermal expansion (CTE) was determined as specified in DIN 53,752, process A, on 2 specimens (10×10×4 cm) per test. The values stated are those measured in the longitudinal direction at 25° C.

The compositions and the results of the processing tests are listed in Table 1 below.

TABLE 1

| Composition No. | C1 | C2 | 1 | 2 | C3 |
|---|---|---|---|---|---|
| Component [wt %] | | | | | |
| A¹ | 61.4 | 61.1 | 59.1 | 55.9 | 43.9 |
| B¹ | 6.7 | 6.7 | 6.7 | 6.6 | 6.6 |
| B² | 6.7 | 6.7 | 6.7 | 6.6 | 6.6 |
| C¹ | 13.2 | 11.8 | 11.6 | 11.5 | 11.5 |
| D¹ | 12 | 12 | 12 | 12 | 12 |
| I | — | — | 2 | 5 | 17 |
| E¹ | — | 0.2 | 0.4 | 0.4 | 0.4 |
| E² | — | — | — | 0.5 | 0.5 |
| F¹ | — | 1.5 | 1.5 | 1.5 | 1.5 |
| Properties: | | | | | |
| Vicat B [° C.] | 131 | 130 | 129 | 128 | 117 |
| $W_s$ −30° C. [Nm] | 65 | 80 | 81 | 82 | 53 |
| Deformation [mm] | 14.7 | 12.2 | 16.0 | 16.4 | 12.1 |
| MVI [mL/10 min] | 11 | 9 | 14 | 19 | 34 |
| $a_k$ [kJ/m²] | 27 | 43 | 42 | 42 | 21 |
| Elongation at break [%] | 25 | 81 | 101 | 121 | 45 |
| CTE [$10^{-6}$ $K^{-1}$] | 54 | 55 | 55 | 56 | 63 |

We claim:
1. A molding composition obtained from
A) at least one polycarbonate,
B) at least one graft polymer based on acrylate rubbers or siloxane rubbers or mixtures thereof having a glass transition point below 10° C.,
C) at least one copolymer containing vinylaromatic monomers,
D) at least one particulate filler, of which at least 95% by weight of the particles have a diameter (largest dimension), determined on the finished product, of less than 45 μm and an aspect ratio of from 1:1 to 25:1,
E) citric acid or a mixture of citric acid and p-toluenesulfonic acid
and in addition, if desired,
F) at least one polyacrylate,
G) at least one flame retardant and
H) at least one additive,
wherein said molding composition contains
I) 0.1 to 8% by weight based on the total weight of the composition of an aromatic or partially aromatic polyester or mixture thereof,
by blending said components.

2. A molding composition as claimed in claim 1, wherein blending of the components is carried out be extruding, kneading or rolling the components together.

3. A molding composition as claimed in claim 1, wherein component I is a polyalkylene terephthalate.

4. A molding composition as claimed in claim 1, wherein the content of component I therein is
   I) from 0.1 to 10 wt %, based on the total weight of the molding composition.

5. A molding composition as claimed in claim 1, wherein components B and/or C are polymers containing oxazoline groups.

6. A molding composition as claimed in claim 1, wherein component D is at least one particulate filler, in which at least 95 wt % of all particles have a diameter (largest dimension) of less than 45 μm and their aspect ratio ranges from 1 to 25.

7. A molding composition as claimed in claim 1, wherein component F is a polymethyl methacrylate having a molecular weight (number average $M_n$) of at least 1,000,000 g/mol.

8. A molding composition as claimed in claim 1, wherein component E is citric acid or p-toluenesulfonic acid or a mixture thereof.

9. A shaped article made from a molding composition as claimed in claim 1.

10. A vehicle body part made from a molding composition as claimed in claim 1.

11. A molding composition as claimed in claim 1, wherein compound E is from 1 to 99% by weight of citric acid and from 1 to 99% by weight of p-toluenesulfonic acid.

12. A molding composition as claimed in claim 1, wherein compound E is from 10 to 90% by weight of citric acid and from 10 to 90% by weight of p-toluenesulfonic acid.

* * * * *